(12) United States Patent
Deshmukh et al.

(10) Patent No.: US 11,683,244 B2
(45) Date of Patent: *Jun. 20, 2023

(54) REAL AVAILABILITY APPLICATION

(71) Applicant: inContact INC., Sandy, UT (US)

(72) Inventors: Tushar Deshmukh, Maharashtra (IN); Sebastien Roland Mancel, Danville, CA (US); Ashish Seth, Los Altos, CA (US); Saiprasad Vyawahare, Hingoli (IN); Deepak Tiwari, Maharashtra (IN); Omkar Shrihari Joglekar, Maharashtra (IN); Susmith Roy, Assam (IN)

(73) Assignee: INCONTACT INC., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,653

(22) Filed: Jan. 13, 2022

(65) Prior Publication Data
US 2022/0263728 A1 Aug. 18, 2022

Related U.S. Application Data

(63) Continuation of application No. 17/175,667, filed on Feb. 14, 2021, now Pat. No. 11,271,825.

(51) Int. Cl.
*H04L 41/14* (2022.01)
*H04L 41/5009* (2022.01)

(52) U.S. Cl.
CPC .......... *H04L 41/5012* (2013.01); *H04L 41/14* (2013.01)

(58) Field of Classification Search
None
See application file for complete search history.

(56) References Cited

U.S. PATENT DOCUMENTS

| | | | |
|---|---|---|---|
| 11,206,237 B1* | 12/2021 | Yan | G06Q 30/016 |
| 11,271,825 B1* | 3/2022 | Deshmukh | H04L 41/5012 |
| 2016/0253628 A1* | 9/2016 | Uretzky | H04L 67/54 |
| | | | 705/7.18 |
| 2017/0169098 A1* | 6/2017 | Frankel | H04L 51/04 |
| 2017/0270099 A1* | 9/2017 | Gorny | G06F 40/30 |

(Continued)

*Primary Examiner* — Joshua Joo
(74) *Attorney, Agent, or Firm* — Soroker-Agmon-Nordman; Sharone Godesh; Daniel Schatz (57) ABSTRACT

A computerized-method for providing an indication as to an availability of a communication-channel type that is used during an interaction with a customer, via a web app is provided herein. The computerized-method includes operating a communication-channel-type availability module that includes: receiving collected data of an interaction of an agent during an interaction with a customer, via a communication-channel-type from a communication manager module; operating one or more analyses on the collected data to yield a corresponding score of each analysis of the one or more analyses; calculating an availability-score of the communication-channel-type during the interaction, based on the score for each analysis of the one or more analyses; storing the calculated availability-score, in a data storage, as an availability-score of the agent, after the interaction ends; and displaying the availability-score as an indication to an availability of a communication-channel type, on a display unit, associated with the computerized system.

15 Claims, 5 Drawing Sheets

(56) References Cited

U.S. PATENT DOCUMENTS

| | | | |
|---|---|---|---|
| 2020/0251102 A1* | 8/2020 | Benkreira | G10L 15/1815 |
| 2020/0272793 A1* | 8/2020 | Gorny | G06F 17/18 |
| 2021/0044699 A1* | 2/2021 | Thalange | G06Q 30/016 |
| 2022/0166885 A1* | 5/2022 | Bergher | H04M 3/5183 |
| 2022/0210625 A1* | 6/2022 | Sharifi | H04W 4/50 |
| 2022/0231983 A1* | 7/2022 | Schumacher | H04L 51/226 |

* cited by examiner

REAL AVAILABILITY APPLICATION

RELATED APPLICATIONS

This application claims priority as a continuation from U.S. patent application Ser. No. 17/175,667 dated Feb. 14, 2021, the disclosure of which is incorporated herein by reference.

TECHNICAL FIELD

The present disclosure relates to the field of determining a level of availability of a communication channel of an agent during an interaction with a customer via a communication device.

BACKGROUND

Increasingly, agents of contact centers are mobile and interacting with customers via handheld computerized devices from different locations. Agents' mobility implies work from home, or in transit or in outdoor environments where conditions may affect the agent's proficiency and the level of availability to provide service to customers, which may result in quality reduction of customer experience.

In current contact center systems, an availability status of agents is largely driven by the agents setting the state by themselves or via availability rules that do not account for agent's surroundings and its impact on the agents' cognitive load. Therefore, these binary methods ignore key qualitative and cognitive indicators metrics that can impact the agent's ability to meet business Key Performance Indicator (KPI)s which are relating to customer experience.

The level of availability of an agent may include factors, which may be influenced by the environment, such as the network strength or voice quality, ambient noise, agent's sentiment score and cognitive abilities. For example, external noise, or the agent being distracted by other tasks or obligations.

Thus, to increase customer experience, a score of the availability of an agent's communication-channel type should be determined and also the level of availability of an agent's communication-channel type as an indication for routing logic, in a contact center. For example, the determining of the score of availability of an agent's communication-channel type may trigger a recommendation to the agent during the interaction, so the agent may act upon it and switch the communication-channel type. In another example, when an availability-score of an agent's communication-channel type, such as voice is marked as low, during an interaction, future voice interactions may not be routed to this agent over a specified period of time. The voice may be marked as low according to a preconfigured threshold.

Accordingly, there is a need for a technical solution to provide an indication as to an availability of a communication-channel type that is used during an interaction with a customer. The needed technical solution has to evaluate agent work conditions and to provide a level of availability of an agent for call routing considerations. The needed technical solution should also incorporate the impact of agent surroundings to assess the agent's cognitive ability and thus be considered when driving routing decisions to achieve optimal customer experience (KPI)s.

SUMMARY

There is thus provided, in accordance with some embodiments of the present disclosure, a computerized method for providing an indication as to an availability of a communication-channel type that is used during an interaction with a customer, via a web app.

Furthermore, in accordance with some embodiments of the present disclosure, in a computerized system comprising a communication manager module to collect data of an interaction of an agent during an interaction with a customer, via a communication-channel-type, by a web app that is running on a communication device, the computerized-method may operate a communication-channel-type availability module.

Furthermore, in accordance with some embodiments of the present disclosure, the communication-channel-type availability module may include receiving the collected data from the communication manager module and operating one or more analyses on the collected data to yield a corresponding score for each analysis of the one or more analyses.

Furthermore, in accordance with some embodiments of the present disclosure, the communication-channel-type availability module may further calculate an availability-score of the communication-channel-type during the interaction based on the score of each analysis of the one or more analyses and store the calculated availability-score, in a data storage, as an availability-score of the agent, after the interaction ends.

Furthermore, in accordance with some embodiments of the present disclosure, the communication-channel-type availability module may further display the availability-score as an indication to an availability of an agent via the communication-channel type, on a display unit that is associated to the computerized system.

Furthermore, in accordance with some embodiments of the present disclosure, the data collected from the communication manager module may be received from at least one sensor that is running on the communication device.

Furthermore, in accordance with some embodiments of the present disclosure, the at least one sensor may be selected from at least one of: a microphone, a geolocation sensor, a motion sensor and a network sensor.

Furthermore, in accordance with some embodiments of the present disclosure, the one or more analyses may be operated on the collected data and may be selected from at least one of: sentiment analysis; network quality analysis; ambient noise analysis; and agent movement analysis.

Furthermore, in accordance with some embodiments of the present disclosure, the network quality analysis may include a voice network strength and a stability of internet connection strength.

Furthermore, in accordance with some embodiments of the present disclosure, the communication-channel-type availability module may further include associating the availability-score when the availability-score may be above a first preconfigured threshold, to a voice-channel category and associating the availability-score when the availability-score may be below the first preconfigured threshold and above a second preconfigured threshold, to a real-time digital-channel category and associating the availability-score when the availability-score may be below the second preconfigured threshold to a non-real-time digital channel category.

Furthermore, in accordance with some embodiments of the present disclosure, the communication-channel-type availability module may further include sending a visual cue to the agent during the interaction when the communication-channel-type is different than the associated category of the availability-score to be displayed on a display unit associated to the communication device during the interaction.

Furthermore, in accordance with some embodiments of the present disclosure, the displayed visual cue includes a recommendation to the agent to switch the communication-channel-type to the communication-channel-type of the category of the availability-score.

Furthermore, in accordance with some embodiments of the present disclosure, the availability-score of the agent may be retrieved from the data storage by an interactions routing engine, every preconfigured interval of time.

Furthermore, in accordance with some embodiments of the present disclosure, the availability-score may be continuously tracked during the interaction, every preconfigured interval of time.

Furthermore, in accordance with some embodiments of the present disclosure, when the communication-channel-type may be voice, and voice network strength may be above a first preconfigured threshold, the communication-channel-type availability module may be further calculating a weighted sum of the score of the ambient noise analysis and the score of the agent movement analysis, and when the calculated weighted sum may be above a second preconfigured threshold and an internet connection strength stability may be above a third preconfigured threshold, the communication-channel-type availability module may be further associating the availability-score to a real-time digital-channel category.

Furthermore, in accordance with some embodiments of the present disclosure, when the communication-channel-type may be digital, and the internet connection strength stability is above a preconfigured threshold, the communication-channel-type availability module may be further associating the availability-score to a real-time digital-channel category.

Furthermore, in accordance with some embodiments of the present disclosure, when the communication-channel-type may be digital, and the internet connection strength stability may be below a first preconfigured threshold, and a voice network strength may be below a second preconfigured threshold, the communication-channel-type availability module may be further associating the availability-score to a non-real-time digital-channel category.

Furthermore, in accordance with some embodiments of the present disclosure, when the communication-channel-type may be digital, and the internet connection strength may be below a first preconfigured threshold, and a voice network strength may be above a second preconfigured threshold, the communication-channel-type availability module may be further associating the availability-score to a voice-channel category.

Furthermore, in accordance with some embodiments of the present disclosure, the availability-score may be determined according to a score of the sentiment analysis.

There is further provided, in accordance with some embodiments of the present invention, a computerized-system for providing an indication as to an availability of a communication-channel type that is used during an interaction with a customer, via a web app.

Furthermore, in accordance with some embodiments of the present disclosure, the computerized-system may include a processor, a data storage, a memory to store the data storage, a display unit and a communication manager module to collect data of an interaction of an agent during an interaction with a customer, via a communication-channel-type, by a web app that is running on a communication device and a server for operating a communication-channel-type availability module.

Furthermore, in accordance with some embodiments of the present disclosure, the communication-channel-type availability module may be configured to receive the collected data from the communication manager module and to operate one or more analyses on the collected data to yield a corresponding score for each analysis of the one or more analyses.

Furthermore, in accordance with some embodiments of the present disclosure, the communication-channel-type availability module may be further configured to calculate an availability-score of the communication-channel-type during the interaction and to store the calculated availability-score as an availability-score of the agent, after the interaction ends, in a data storage.

Furthermore, in accordance with some embodiments of the present disclosure, the communication-channel-type availability module may be further configured to display the availability-score as an indication to an availability of an agent via the communication-channel type, on the display unit associated with the computerized-system.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information nontransitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Agent productivity and customer experience are two of the most widely used metrics in contact centers. On one hand the agent productivity is constantly measured by the ability to meet Key Performance Indicator (KPI) targets. On the other hand, customer calls may be routed to agents that are unable to meet the contact center's objectives due to environment factors, ability to focus or disposition.

Accordingly, to drive availability state management and routing decisions to meet performance metrics and achieve customer experience targets, there is a need for a technical solution that will track changes in the agent's capacity based on the environmental conditions by determining agent's cognitive disposition and by evaluating a level of availability of the agent to address and resolve customer issues.

Thus, improving agent productivity, contact center performance and overall customer experience by ensuring that routing decisions are taking into consideration agent environment, for example, by implying thresholds of the environmental factors and impact on cognitive capabilities and cognitive load of the agent and finding an optimal communication-channel type to improve customer experience.

The term "communication-channel type" as used herein, refers to any communication channel that an interaction with the contact center may be conducted through it. The communication channel may be a voice channel, such as a phone call or may be a digital channel. The digital channel may be operated in real-time, such as, chat or SMS or may be operated in non real-time, such as email.

The term "visual cue" as used herein refers to an element that draws the attention of a user to a notification or a feedback that is provided via the visual cue within a communication device or via a browser based application.

The terms "web app" and "browser-based application" are interchangeable.

Figure 1A:
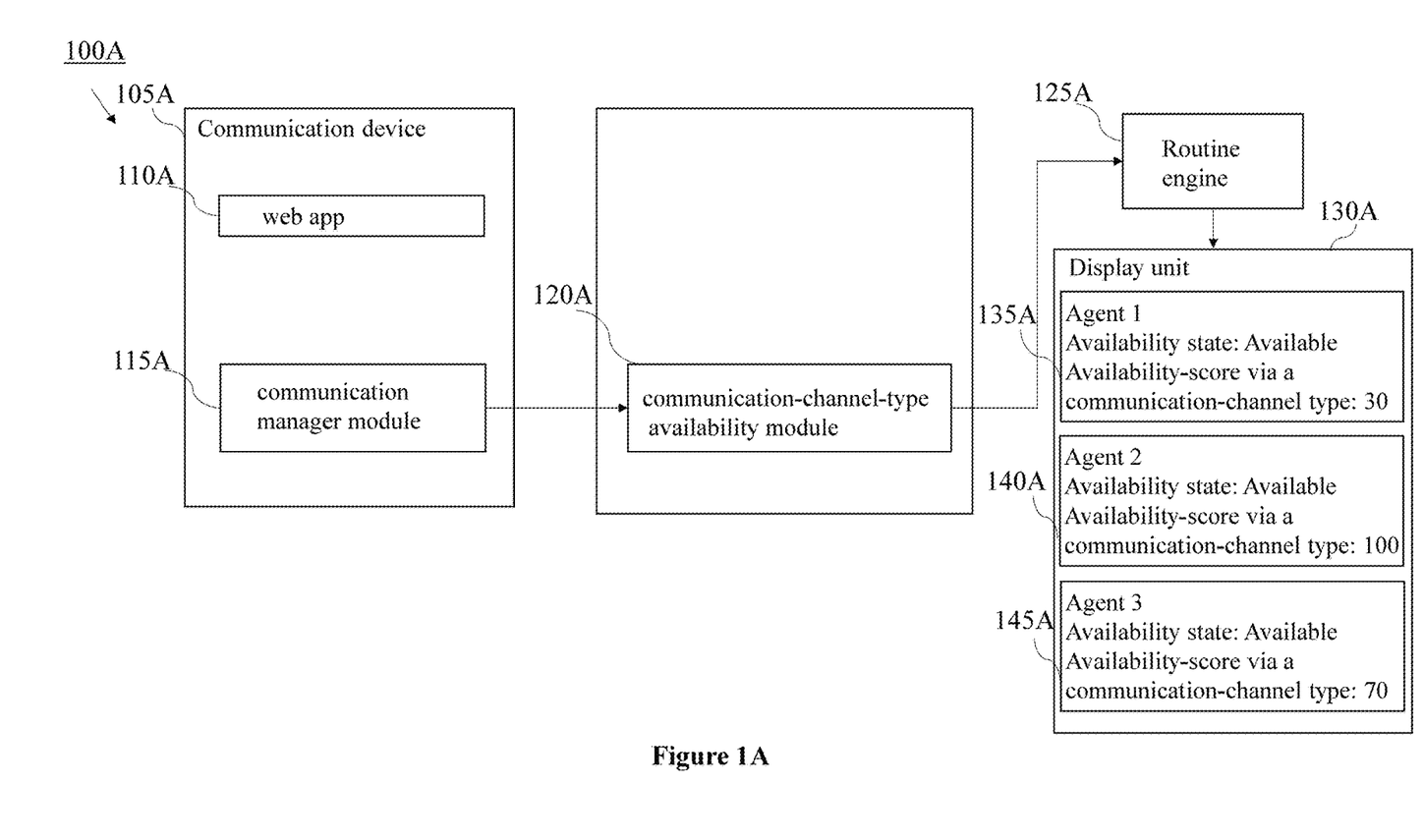
FIG. 1A schematically illustrates a high-level diagram of a computerized-system for providing an indication as to an availability of a communication-channel type that is used during an interaction with a customer, via a web app, in accordance with some embodiments of the present disclosure.

FIG. 1A schematically illustrates a high-level diagram of a computerized-system 100A for providing an indication as to an availability of a communication-channel type that is used during an interaction with a customer, via a web app, in accordance with some embodiments of the present disclosure.

The term "voice call" as used herein, refers to an interaction that may be conducted via mobile phone, landline phone or via Voice Over Internet Protocol (VOIP).

According to some embodiments of the present disclosure, an agent may be conducting an interaction with a customer via a communication device, such as communication device 105A. The interaction may be operated via a browser-based application, such as web app 110A, that is running on the communication device. The communication device 105A may be a mobile device, a laptop, a desktop or any other computerized device. Moreover, the communication device 105A may have geolocation capabilities.

According to some embodiments of the present disclosure, a communication manager module, such as communication manager module 115A may be collecting data of the interaction of an agent during an interaction with a customer, via a communication-channel-type, by a web app 110A that is running on the communication device 105A. The communication manager module 115A may be associated to the communication device 105A.

Figure 3:
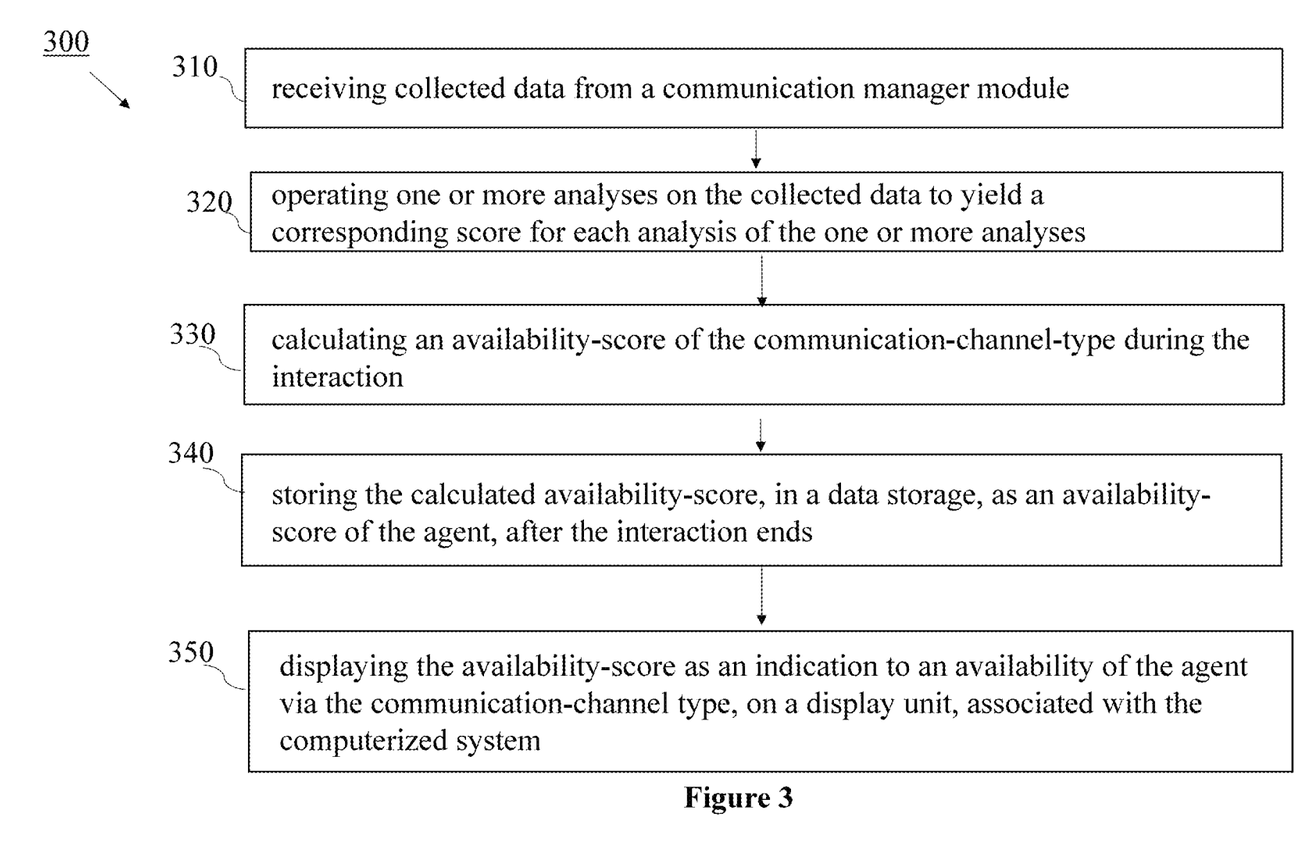
FIG. 3 schematically illustrates a high-level flow diagram depicting a communication-channel-type availability module, according to some embodiments of the present disclosure.

According to some embodiments of the present disclosure, the computerized-system 100A may include a communication-channel-type availability module, such as communication-channel-type availability module 120A and such as communication-channel-type availability module 300 in FIG. 3. The communication-channel-type availability module, such as communication-channel-type availability module 120A, may receive the collected data from the communication manager module 115A and may operate one or more analyses on the collected data to yield a corresponding score for each analysis of the one or more analyses.

According to some embodiments of the present disclosure, the communication-channel-type availability module, such as communication-channel-type availability module 120A, may calculate an availability-score of the communication-channel-type based on the score of each analysis of the one or more analyses, during the interaction of the agent with the customer and then may store the calculated availability-score, in a data storage (not shown), as an availability-score of the agent, after the interaction ends.

According to some embodiments of the present disclosure, the calculated availability-score which has been stored in the data storage, may be retrieved by a routing engine, such as routing engine 125A and may be considered when distributing an incoming interaction to the agent. For example, when the availability-score of a communication-channel type during an interaction of an agent, such as voice is low, only digital communication-channel interactions may be routed later on to the agent.

According to some embodiments of the present disclosure, the calculated availability-score, which has been stored in the data storage, may be displayed as an indication to an availability of the agent via the communication-channel-type, on a display unit, such as display unit 130A which may be associated with the computerized system 100A.

According to some embodiments of the present disclosure, the communication-channel-type availability module 120 may associate the availability-score when the availability-score is above a first preconfigured threshold, to a voice-channel category. The communication-channel-type availability module 120 may associate the availability-score when the availability-score is below the first preconfigured threshold and above a second preconfigured threshold, to a real-time digital-channel category and may associate the availability-score when the availability-score is below the second preconfigured threshold to a non-real-time digital channel category.

According to some embodiments of the present disclosure, the communication-channel-type availability module 120 may send a visual cue to the agent during the interaction when the communication-channel-type is different than the associated category of the availability-score to be displayed on a display unit associated to the communication device during the interaction. The displayed visual cue may include a recommendation to the agent to switch the communication-channel-type to the communication-channel-type of the category of the availability-score.

According to some embodiments of the present disclosure, the display unit, such as display unit 130A, may present details of agents, their availability state and an availability-score via a communication-channel type. The communication-channel type may be for example, voice. Accordingly, display unit 130A may present 'Agent 1' 135A as available to receive interactions but having an availability-score via voice equals '30'. Therefore, when a threshold for voice interaction may have been set to be above '65', 'Agent 1' 135A will be routed by the routing engine 125A, only digital communication-channel interactions. Agents, 'Agent 2' 140A and 'Agent 3' 145A, which are available, e.g., their availability state is available and have an availability-score via voice above '65', will be forwarded voice interactions by the routine engine 125A.

According to some embodiments of the present disclosure, the display unit, such as display unit 130A may present details of agents, their availability and an availability-score of a communication-channel type. The communication-channel type may be, in another example, real-time digital, such as chat. Accordingly, display unit 130A may present 'Agent 1' 135A as available to receive interactions but having an availability-score via real-time digital equals '30'. Therefore, when a threshold for real-time digital interaction may have been set to be above '80', 'Agent 1' 135A and 'Agent 3' 145A will be routed, by routing engine 125A, only non real-time digital communication-channel interactions. 'Agent 2' 140A, which is available, e.g., the availability state is available and the availability-score via real-time digital is above '80', e.g., '100', will be routed by routing engine 125A, real-time digital interactions.

According to some embodiments of the present disclosure, each communication-channel type may be displayed on a different section of the display unit (not shown). For example, a section of agents and the related availability score via voice communication-channel, a section of agents and the related availability score via real-time digital communication-channel and a section of agents and the related availability score via non real-time digital communication-channel. The display unit may be presented to a user, such as a supervisor of a shift and the like, so that the user may make management decisions.

Figure 1B:
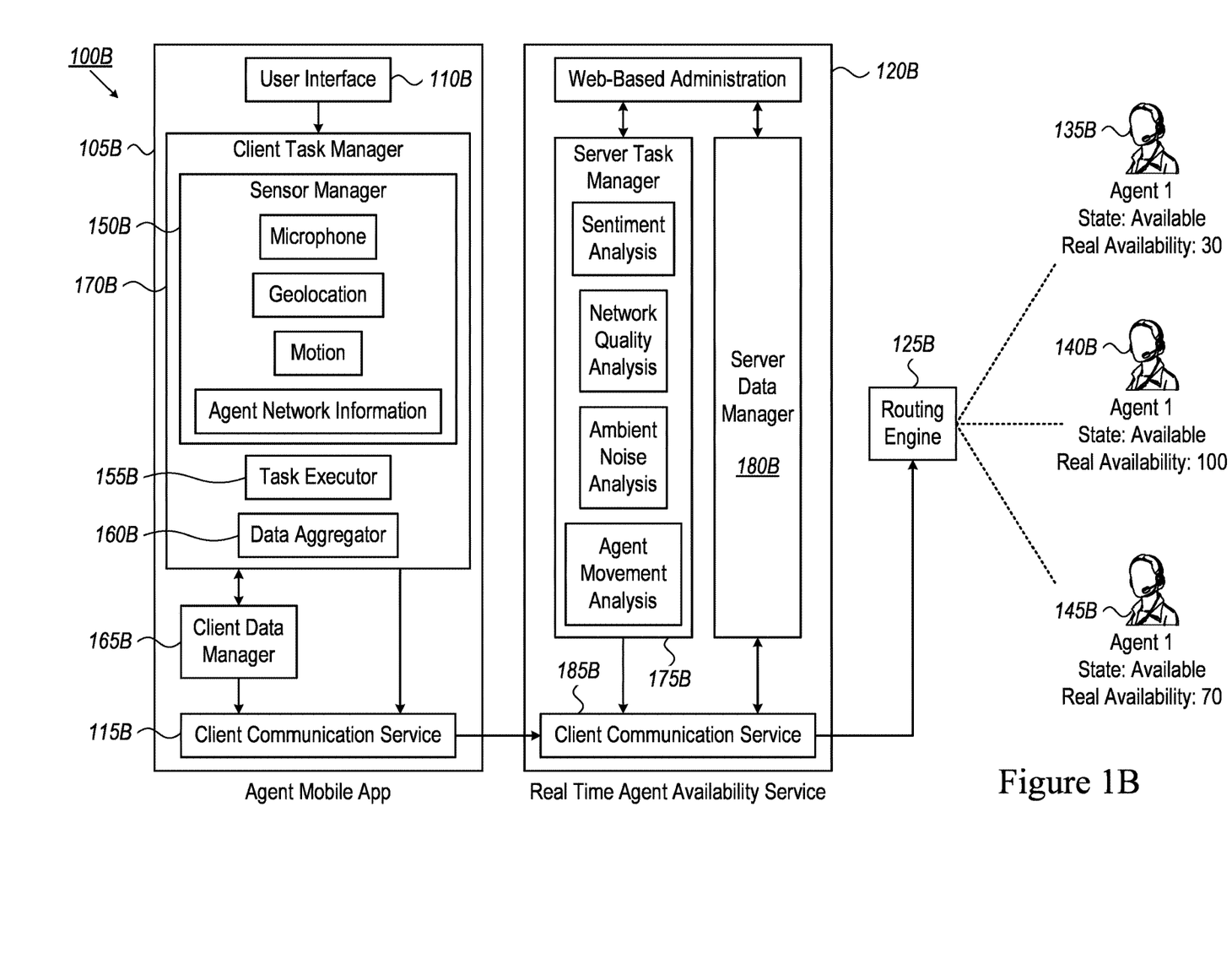
FIG. 1B schematically illustrates a high-level diagram of an example of a computerized-system for providing an indication as to an availability of a communication-channel type that is used during an interaction with a customer, via a web app, in accordance with some embodiments of the present disclosure.

FIG. 1B schematically illustrates a high-level diagram of an example of a computerized-system 100B for providing an indication as to an availability of a communication-channel type that is used during an interaction with a customer, via a web app, in accordance with some embodiments of the present disclosure.

According to some embodiments of the present disclosure, as soon as an interaction starts between an agent and a customer, via a web app, such as web app 110A in FIG. 1A, that is running on a communication device, such as communication device 105A in FIG. 1A the event may be triggered and sent to a client task manager, such as client task manager 170B. Then, the client task manager 170B may request the task executor 155B to perform the tasks based on the media type, e.g., communication-channel type. These tasks may be stored in the client data manager 165B.

According to some embodiments of the present disclosure, the client task manager 170B may then collect data from the sensor manager 150B and may send it to data aggregator 160B to aggregate based on interaction id and combine all readings to prepare the context of all collected data for a given interaction id. Once this is done, the data aggregator 160B may send the response to the client communication service 115B to forward it to the real-time agent availability service 185B. This flow of operations continuous until the interaction ends.

According to some embodiments of the present disclosure, the user interface 110B may be communicating with a client task manager, such as client task manager 170B. The client task manager 170B may be comprised of a sensor manager 150B, a task executor 155B and a data aggregator 160B.

According to some embodiments of the present disclosure, the sensor manager 150B may implement an access to the at least one sensor, such as microphone, geolocation sensor, motion sensor and agent network information sensor. The task executor 155B may interact with client data manager 165B to fetch the tasks to be performed based on the communication-channel type. The data aggregator 160B may create the context for the contact i.e., interaction by combining all the readings from the at least one sensor and may prepare it to send it to a server, such as server communication service 185B.

According to some embodiments of the present disclosure, the client data manager 165B may store the tasks to be performed based on the interaction type, i.e., communication-channel type. The readings from the at least one sensor may be stored in the client data manager 165B until the whole context is prepared for a given interaction id.

According to some embodiments of the present disclosure, the sensor manager may comprise one or more sensors, such as microphone, geolocation sensor, motion sensor and agent network information sensor. The client task manager 170B may be communicating with a client data manger component, such as client data manager 165B which may forward collected data from the client task manager 170B to a client communication service, such as client communication service 115B and such as communication manager module 115A, in FIG. 1A.

According to some embodiments of the present disclosure, when the whole context of the collected data is prepared, the client communication service 115B, such as communication manager module 115A, in FIG. 1A, may send the data to a real-time agent availability service, such as server communication service 120B and such as communication-channel-type availability module 120A in FIG. 1A.

According to some embodiments of the present disclosure, the real-time agent availability service, such as server communication service 120B and such as communication-channel-type availability module 120A in FIG. 1A, may receive the collected data from the communication manager module, e.g., the client communication service, such as client communication service 115B and such as communication manager module 115A, in FIG. 1A.

According to some embodiments of the present disclosure, the real-time agent availability service, such as server communication service 120B and such as communication-channel-type availability module 120A in FIG. 1A, may comprise a server task manager 175B, a sensor data manager 180B and a server communication service 185B which may be communicating with the server task manager 175B and the sensor data manager 180B to forward data that has been received from the client communication service 115B.

According to some embodiments of the present disclosure, the server communication service 185B may receive the data sent by the client communication service 115B.

According to some embodiments of the present disclosure, the real-time agent availability service, such as server communication service 120B and such as communication-channel-type availability module 120A in FIG. 1A, may be operating the server data manager 180B to calculate an availability-score of the communication-channel-type during the interaction based on the score of each analysis of one or more analyses.

According to some embodiments of the present disclosure, the one or more analyses may be performed by the server task manager 175B. The server task manager 175B may perform a sentiment analysis, a network quality analysis, an ambient noise analysis and an agent movement analysis. Results of the analyses may be stored in a server, such as server data manager 180B and may be displayed on a User Interface (UI), such as admin UI per use case.

According to some embodiments of the present disclosure, after the interaction ends, the real-time agent availability service, such as server communication service 120B and such as communication-channel-type availability module 120A in FIG. 1A, may store the calculated availability-score, in a data storage (not shown), as an availability-score of the communication-channel type that the agent used during the interaction.

According to some embodiments of the present disclosure, a routing engine, such as routing engine 125B and such as routing engine 125A in FIG. 1A, may take into consideration the availability-score of the communication-channel type that the agent used, when distributing an incoming interaction to the agent. Optionally, the server communication service 185B may forward the availability-score of the communication-channel type that the agent used during the interaction to the routing engine 125B.

According to some embodiments of the present disclosure, the availability-score of the agent may be displayed on a display unit, such as display unit 130A in FIG. 1A as an indication to an availability of the agent via the presented communication-channel type. The availability-score of the agent via the presented communication-channel type may be displayed on the display unit as 'real availability' of the agent and may be referred to as an indication to the routine engine 125B if an agent is available to receive interactions via the specified communication-channel type.

According to some embodiments of the present disclosure, the display unit (not shown), such as display unit 130A in FIG. 1A, may present details of agents, their availability and an availability-score of a communication-channel type. The communication-channel type may be for example, voice. Accordingly, the display unit may present 'Agent 1' 135B as available to receive interactions but having an availability-score via a communication-channel type, such as voice, equals '30'. Therefore, when a threshold for voice interaction may have been set to be above '65', 'Agent 1' 135B will be routed by the routing engine 125B, only digital communication-channel interactions. Agents, 'Agent 2' 140B and 'Agent 3' 145B, which are available, e.g., their availability state is available and have an availability-score via voice above '65', will be forwarded voice interactions by the routine engine 125B.

According to some embodiments of the present disclosure, the display unit, may present details of agents, such as their availability and an availability-score of a communication-channel type. The communication-channel type may be, in another example, real-time digital, such as chat. Accordingly, the display unit may present 'Agent 1' 135B as available to receive interactions but having an availability-score via real-time digital equals '30'. Therefore, when a threshold for real-time digital interaction may have been set to be above '80', 'Agent 1' 135B and 'Agent 3' 145B will be routed, by routing engine 125B, only non real-time digital communication-channel interactions. 'Agent 2' 140B, which is available, e.g., the availability state is available and the availability-score via real-time digital is above '80', e.g., '100', may be routed by routing engine 125B, real-time digital interactions.

Figure 2A:
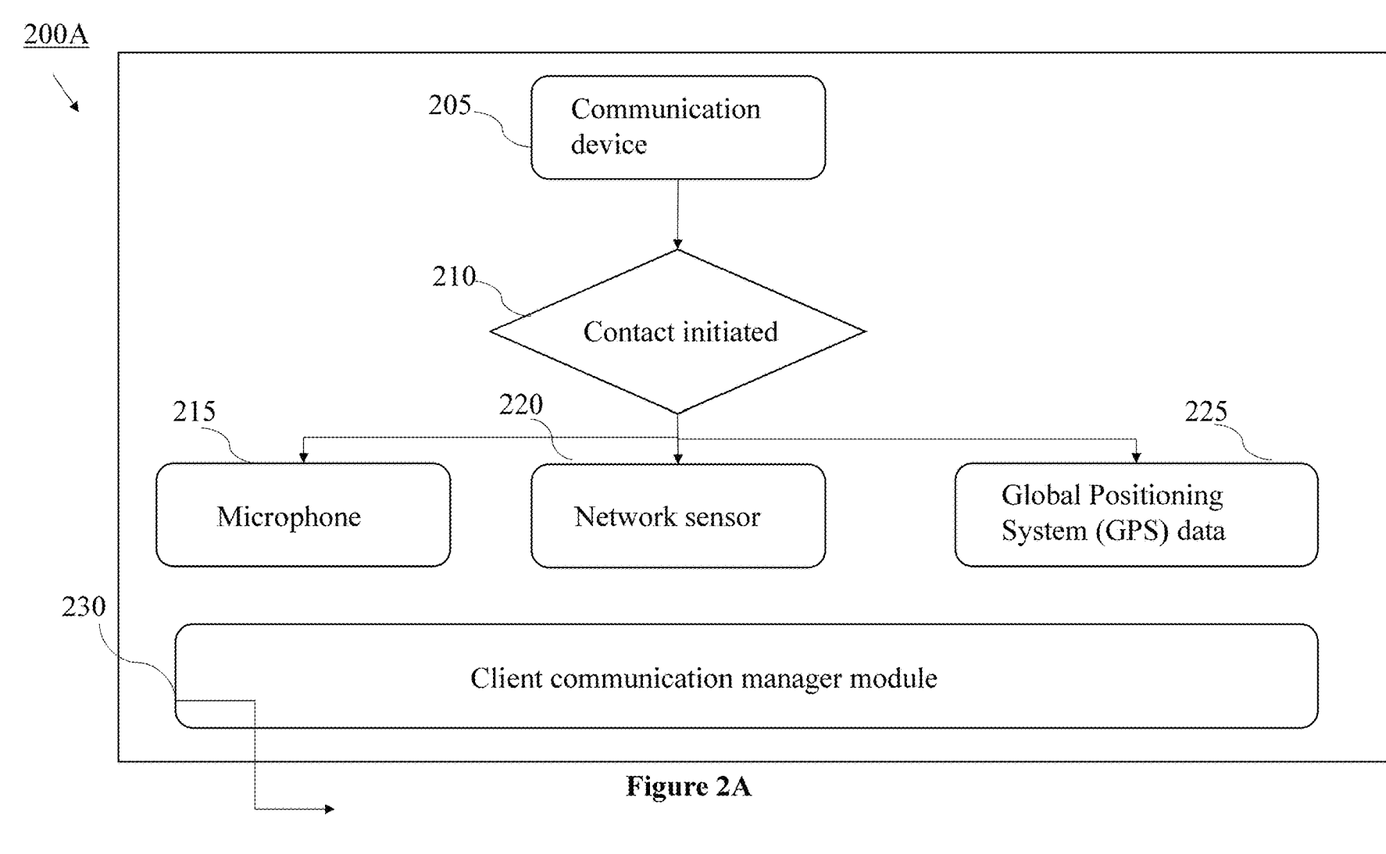
FIG. 2A schematically illustrates a flowchart in a communication device, in accordance with some embodiments of the present disclosure.

FIG. 2A schematically illustrates a flowchart 200A in a communication device, in accordance with some embodiments of the present disclosure.

According to some embodiments of the present disclosure, in a computerized system that may comprise a client communication manager module, such as client communication manager module 230, and such as communication manager module 115A in FIG. 1A, the client communication manager module may collect data of an interaction of an agent during an interaction with a customer, after a contact initiated 210, via a communication-channel-type, by a web app that is running on a communication device, such as communication device 205 and such as communication device 105A in FIG. 1A.

According to some embodiments of the present disclosure, the client communication manager module, such as client communication manager module 230, and such as communication manager module 115A in FIG. 1A, may operate at least one sensor that may be associated to the communication device 205. The at least one sensor may be selected from: microphone, such as microphone 215, geo-location sensor, to collect data, such as Global Positioning System (GPS) data 225, motion sensor (not shown) and network sensor, such as network sensor 220.

Figure 2B:
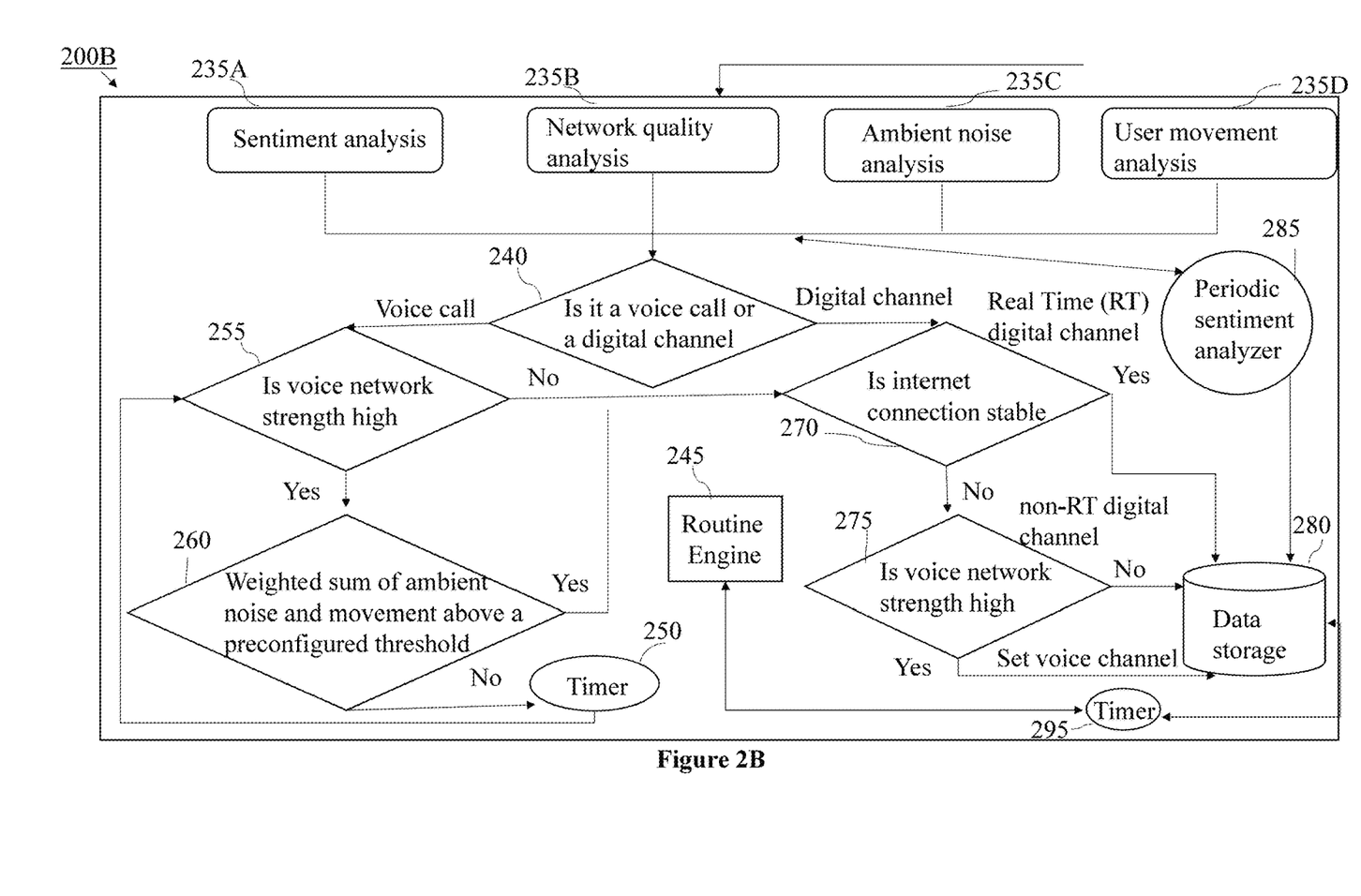
FIG. 2B schematically illustrates a flowchart of a communication-channel-type availability module, in accordance with some embodiments of the present disclosure.

According to some embodiments of the present disclosure, the client communication manager module, such as client communication manager module 230, and such as client communication service 115B in FIG. 1B, may forward the collected data to a communication-channel-type availability module 200B in FIG. 2B, and such as communication-channel-type availability module 120B in FIG. 1B.

FIG. 2B schematically illustrates a flowchart of a communication-channel-type availability module 200B, in accordance with some embodiments of the present disclosure.

According to some embodiments of the present disclosure, the communication-channel-type availability module 200B may receive the collected data from the client communication manager module, such as client communication manager module 230, and such as communication manager module 115B in FIG. 1B and may operate one or more analyses on the collected data to yield a corresponding score for each analysis of the one or more analyses.

According to some embodiments of the present disclosure, the one or more analyses on the collected data, may be sentiment analysis 235A, network quality analysis 235B, ambient noise analysis 235C, user movement analysis 235D or any other analysis.

According to some embodiments of the present disclosure, the network quality analysis, such as network quality analysis 235A, may be calculated according to a ping factor indexing. Each client on the communication device may keep pinging the server every 2-3 seconds. The ping factor may be calculated using formula I:

$$\text{Ping factor} = (T\_actualping - T\_referenceping)/T\_referenceping$$

Whereby:

$T\_actualping$ is the time taken for a client to send a ping to the server.

$T\_referenceping$ is the ideal time a client should take to send a ping to the server.

For example, the network quality may be calculated according to formula I and table I below:

| Ping Factor | Quality |
| --- | --- |
| <0 | Good |
| <0 Ping fator <=1 | Just ok |
| Ping Factor >1 | Bad |

According to some embodiments of the present disclosure, according to table I above, the network quality may be considered as good when the ping factor is lower than zero. The network quality may be considered as 'just ok' when the ping factor is between '1' and zero. The network quality may be considered as bad when the ping factor is greater than '1'.

According to some embodiments of the present disclosure, the network quality analysis, such as network quality analysis 235A, may also include a voice quality analysis. The voice quality may be measured by using Mean Opinion Score (MOS) score. For example, according to table II below:

| MOS Score | Quality |
| --- | --- |
| MOS >4 | Good |
| 3.6-4.0 | Just Ok |
| 3.1-3.6 | Bad |

According to some embodiments of the present disclosure, according to table II above, MOS score above '4' may be considered as good. MOS score in the range of 3.6-4.0 may be considered as 'just ok' and MOS score in the range of 3.1-3.6 may be considered as bad.

According to some embodiments of the present disclosure, a ambient noise analysis, such as ambient noise analysis 235C, a user may define a noise threshold based on regular noise levels in the working area. For example, sound levels greater than '65' decibels (DB) may be considered noisy when a user, such as an agent is in a quiet place, but if the user is in a crowded office or a manufacturing industry, then noise thresholds may be set as greater than 75 DB.

According to some embodiments of the present disclosure, a user movement analysis, such as movement analysis 235D, may be calculated for example, according to table III below:

| Movement for last 5 minutes | Categorized As |
| --- | --- |
| <2 meters | No Movement |
| 50 steps per minute Or >10 meters per minute | Continuous Movement |

According to some embodiments of the present disclosure, according to table III above, the movement of an agent that is using a communication device to conduct an interaction with a customer, may be considered as no movement when, for example, the agent has moved less than two meters in the last five minutes. The movement of the agent may be considered as continuous movement when, for example the agent has moved fifty steps per minutes or more than ten meters per minute in the last five minutes.

According to some embodiments of the present disclosure, the communication-channel-type availability module 200B may calculate an availability-score also based on a periodic sentiment analyzer 285. The continuous sentiment analysis over a period of time may be used to make an improved and stronger recommendation of an availability.

According to some embodiments of the present disclosure, the communication-channel-type availability module 200B may check if the interaction is a voice call or a digital channel 240.

According to some embodiments of the present disclosure, if the interaction between the agent and the customer is conducted via a communication-channel, such as a voice call, the communication-channel-type availability module 200B may check if voice network strength is high 255. If the voice network strength is high, according to a preconfigured threshold, then the communication-channel-type availability module 200B may check if a weighted sum of ambient noise and movement is above a preconfigured threshold.

According to some embodiments of the present disclosure, when the communication-channel-type is voice, and voice network strength is above a first preconfigured threshold, the communication-channel-type availability module is further calculating a weighted sum of the score of the ambient noise analysis and the score of the agent movement analysis, and wherein when the calculated weighted sum is above a second preconfigured threshold and an internet connection strength stability is above a third preconfigured threshold, the communication-channel-type availability module is further associating the availability-score to a real-time digital-channel category.

According to some embodiments of the present disclosure, when the communication-channel-type is digital, and the internet connection strength stability is above a preconfigured threshold, the communication-channel-type availability module is further associating the availability-score to a real-time digital-channel category.

According to some embodiments of the present disclosure, when the communication-channel-type is digital, and the internet connection strength is below a first preconfigured threshold, and a voice network strength is above a second preconfigured threshold, the communication-channel-type availability module is further associating the availability-score to a voice-channel category.

According to some embodiments of the present disclosure, if a weighted sum of ambient noise and movement is above a preconfigured threshold then the communication-channel-type availability module 200B may set the availability-score of voice communication-channel as low and then check parameters which are related to the availability of digital communication-channel.

According to some embodiments of the present disclosure, the digital related parameters may be if the internet connection is stable 270. If the internet connection is stable then the availability-score of real-time digital communication-channel may be set as 'high' and stored it in a data storage, such as data storage 280. If the internet connection is not stable, then the communication-channel-type availability module 200B may check if the voice network strength is high 275, according to a preconfigured threshold. If the voice network strength is not high, according to a preconfigured threshold, then the availability-score of non real-time digital communication-channel may be set as high and stored it in a data storage, such as data storage 280.

According to some embodiments of the present disclosure, if voice network strength is high, according to the preconfigured threshold, then the availability-score of voice communication-channel may be set as high and store it in the data storage 280. When the carrier network strength is high it may enable a good voice quality and for that reason the voice channel may be recommended over the carrier network and not over the internet, e.g., via VOIP or channels that depend on internet connectivity.

According to some embodiments of the present disclosure, every preconfigured time, according to a timer, such as timer 295, the routing engine, such as routing engine 245 may retrieve the availability-score of each communication-channel type that is related to available agents, for routing decisions purposes. For example, voice calls may be routed by the routine engine 245, such as routine engine 125B in FIG. 1B, to agents that their availability-score of voice communication-channel is above a predefined threshold.

According to some embodiments of the present disclosure, when the weighted sum of ambient noise and movement may not be above a preconfigured threshold, the voice network strength 255 may be checked every preconfigured period of time by a timer, such as timer 250, during an interaction of the agent with the customer.

FIG. 3 schematically illustrates a high-level flow diagram depicting a communication-channel-type availability module 300, according to some embodiments of the present disclosure.

According to some embodiments of the present disclosure, a communication-channel-type availability module 300 may be a communication-channel-type availability module, such as communication-channel-type availability module 120A in FIG. 1A.

According to some embodiments of the present disclosure, in a computerized system, such as computerized system 100A in FIG. 1A comprising a communication manager module, such as communication manager module 115A to collect data of an interaction of an agent during an interaction with a customer, via a communication-channel-type, by a web app that is running on a communication device, such as communication device 105A in FIG. 1A.

According to some embodiments of the present disclosure, operation 310 may comprise receiving collected data from a communication manager module. The communication manager module, may be a communication manager module 115A in FIG. 1A that is associated to the communication device, such as communication device 105A in FIG. 1A.

According to some embodiments of the present disclosure, operation 320 may comprise operating one or more analyses on the collected data to yield a corresponding score for each analysis of the one or more analyses.

According to some embodiments of the present disclosure, the one or more analyses may be sentiment analysis, such as sentiment analysis 235A in FIG. 2B, network quality analysis, such as network quality analysis 235B in FIG. 2B, ambient noise analysis, such as ambient noise analysis 235C in FIG. 2B, user movement analysis, such as user movement analysis 235D in FIG. 2B or any other analysis.

According to some embodiments of the present disclosure, operation 330 may comprise calculating an availability-score of the communication-channel-type during the interaction, based on the score for each analysis of the one or more analyses.

According to some embodiments of the present disclosure, the data collected from the communication manager module 115A in FIG. 1A may be received from at least one sensor that is running on the communication device 105A in FIG. 1A. The at least one sensor may be selected from at least one of microphone, geolocation sensor, motion sensor and network sensor.

According to some embodiments of the present disclosure, operation 340 may comprise storing the calculated availability-score, in a data storage, as an availability-score of the agent, after the interaction ends.

According to some embodiments of the present disclosure, the stored availability-score may be used by a routing engine, such as routine engine 125A for routing decisions for later on interactions.

According to some embodiments of the present disclosure, operation 350 may comprise displaying the availability-score as an indication to an availability of the agent via the communication-channel type, on a display unit, associated with the computerized system. The computerized system may be a computerized system, such as computerized system 100A.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for providing an indication as to an availability of an agent via a communication-channel type that is used during an interaction with a customer, via a web app, the computerized-method comprising:

in a computerized system comprising a communication manager module to collect data of the interaction of the agent during the interaction with the customer, via the communication-channel-type, by a web app that is running on a communication device,
receiving the collected data from the communication manager module;
operating one or more analyses on the collected data to yield a corresponding score for each analysis of the one or more analyses;

calculating an availability-score of the communication-channel-type during the interaction based on the score of each analysis of the one or more analyses, storing the calculated availability-score, in a data storage, as an availability-score of the agent;

displaying the availability-score as an indication to an availability of the agent via the communication-channel-type, on a display unit, associated with the computerized system;

associating the availability-score to a channel category based on the availability score; and sending a visual cue to the agent during the interaction when the communication-channel-type is different than the associated category of the availability-score to be displayed on a display unit associated to the communication device during the interaction, wherein the communication-channel-type is selected from at least one of: voice channel, digital channel in real-time and digital channel in non real-time, wherein the one or more analyses operated on the collected data are selected from at least one of: sentiment analysis; network quality analysis; ambient noise analysis; and agent movement analysis, wherein the network quality analysis includes voice network strength and stability of internet connection strength, and wherein the availability-score is determined according to a score of a sentiment analysis.

2. The computerized-method of claim 1, wherein the data collected from the communication manager module is received from at least one sensor that is running on the communication device.

3. The computerized-method of claim 2, wherein the at least one sensor is selected from at least one of: microphone, geolocation sensor, motion sensor and network sensor.

4. The computerized-method of claim 1, wherein the displayed visual cue includes a recommendation to the agent to switch the communication-channel-type to the communication-channel-type of the category of the availability-score.

5. The computerized-method of claim 1, wherein the availability-score of the communication-channel-type of the agent is retrieved from the data storage by an interactions routing engine, every preconfigured interval of time to be considered when distributing an incoming interaction to the agent.

6. The computerized-method of claim 1, wherein the availability-score is continuously tracked during the interaction, every preconfigured interval of time.

7. The computerized-method of claim 1, wherein when the communication-channel-type is voice, and voice network strength is above a first preconfigured threshold, calculating a weighted sum of the score of the ambient noise analysis and the score of the agent movement analysis, and wherein when the calculated weighted sum is above a second preconfigured threshold and an internet connection strength stability is above a third preconfigured threshold, associating the availability-score to a real-time digital-channel category.

8. The computerized-method of claim 1, wherein when the communication-channel-type is digital, and an internet connection strength stability is above a preconfigured threshold, associating the availability-score to a real-time digital-channel category.

9. The computerized-method of claim 1, wherein when the communication-channel-type is digital, and an internet connection strength stability is below a first preconfigured threshold, and a voice network strength is below a second preconfigured threshold, associating the availability-score to a non-real-time digital-channel category.

10. The computerized-method of claim 1, wherein when the communication-channel-type is digital, and an internet connection strength is below a first preconfigured threshold, and a voice network strength is above a second preconfigured threshold, associating the availability-score to a voice-channel category.

11. The computerized-method of claim 1, wherein the channel category is selected from at least one of: voice channel, digital channel in real-time and digital channel in non real-time.

12. A computerized-system for providing an indication as to an availability of an agent via a communication-channel type that is used during an interaction with a customer, via a web app, the computerized-system comprising:

a processor;
a data storage;
a memory to store the data storage;
a display unit;
a communication manager module to collect data of an interaction of the agent during the interaction with a customer, via the communication-channel-type, by a web app that is running on a communication device; and
a server for operating a communication-channel-type availability module, said communication-channel-type availability module is configured to:
receive the collected data from the communication manager module;
operate one or more analyses on the collected data to yield a corresponding score for each analysis of the one or more analyses;
calculate an availability-score of the communication-channel-type during the interaction based on the score of each analysis of the one or more analyses;
store the calculated availability-score as an availability-score of the agent, after the interaction ends;
display the availability-score as an indication to an availability of the agent via the communication-channel type, on a display unit, associated with the computerized system;
associating the availability-score to a channel category based on the availability score; and
sending a visual cue to the agent during the interaction when the communication-channel-type is different than the associated category of the availability-score to be displayed on a display unit associated to the communication device during the interaction,
wherein the communication-channel-type is selected from at least one of: voice channel, digital channel in real-time and digital channel in non real-time,
wherein the one or more analyses operated on the collected data are selected from at least one of: sentiment analysis; network quality analysis; ambient noise analysis; and agent movement analysis,
wherein the network quality analysis includes voice network strength and stability of internet connection strength, and
wherein the availability-score is determined according to a score of a sentiment analysis.

13. A computerized-method for providing an indication as to an availability of an agent via a communication-channel type that is used during an interaction with a customer, via a web app, the computerized-method comprising:

in a computerized system comprising a communication manager module to collect data of the interaction of the agent during the interaction with the customer, via the communication-channel-type, by a web app that is running on a communication device, receiving the collected data from the communication manager module;

operating one or more analyses on the collected data to yield a corresponding score for each analysis of the one or more analyses;

calculating an availability-score of the communication-channel-type during the interaction based on the score of each analysis of the one or more analyses, storing the calculated availability-score, in a data storage, as an availability-score of the agent;

displaying the availability-score as an indication to an availability of the agent via the communication-channel-type, on a display unit, associated with the computerized system;

associating the availability-score to a channel category based on the availability score; and sending a visual cue to the agent during the interaction when the communication-channel-type is different than the associated category of the availability-score to be displayed on a display unit associated to the communication device during the interaction, wherein the communication-channel-type is selected from at least one of: voice channel, digital channel in real-time and digital channel in non real-time, wherein the one or more analyses operated on the collected data are selected from at least one of: sentiment analysis; network quality analysis; ambient noise analysis; and agent movement analysis, wherein the network quality analysis includes voice network strength and stability of internet connection strength, and wherein when the communication-channel-type is voice, and voice network strength is above a first preconfigured threshold, calculating a weighted sum of a score of an ambient noise analysis and a score of the agent movement analysis, and wherein when the calculated weighted sum is above a second preconfigured threshold and an internet connection strength stability is above a third preconfigured threshold, associating the availability-score to a real-time digital-channel category.

14. A computerized-method for providing an indication as to an availability of an agent via a communication-channel type that is used during an interaction with a customer, via a web app, the computerized-method comprising:

in a computerized system comprising a communication manager module to collect data of the interaction of the agent during the interaction with the customer, via the communication-channel-type, by a web app that is running on a communication device, receiving the collected data from the communication manager module;

operating one or more analyses on the collected data to yield a corresponding score for each analysis of the one or more analyses;

calculating an availability-score of the communication-channel-type during the interaction based on the score of each analysis of the one or more analyses, storing the calculated availability-score, in a data storage, as an availability-score of the agent;

displaying the availability-score as an indication to an availability of the agent via the communication-channel-type, on a display unit, associated with the computerized system;

associating the availability-score to a channel category based on the availability score; and sending a visual cue to the agent during the interaction when the communication-channel-type is different than the associated category of the availability-score to be displayed on a display unit associated to the communication device during the interaction, wherein the communication-channel-type is selected from at least one of: voice channel, digital channel in real-time and digital channel in non real-time, wherein the one or more analyses operated on the collected data are selected from at least one of: sentiment analysis; network quality analysis; ambient noise analysis; and agent movement analysis, wherein the network quality analysis includes voice network strength and stability of internet connection strength, and wherein when the communication-channel-type is digital, and an internet connection strength stability is below a first preconfigured threshold, and a voice network strength is below a second preconfigured threshold, associating the availability-score to a non-real-time digital-channel category.

15. A computerized-method for providing an indication as to an availability of an agent via a communication-channel type that is used during an interaction with a customer, via a web app, the computerized-method comprising:

in a computerized system comprising a communication manager module to collect data of the interaction of the agent during the interaction with the customer, via the communication-channel-type, by a web app that is running on a communication device, receiving the collected data from the communication manager module;

operating one or more analyses on the collected data to yield a corresponding score for each analysis of the one or more analyses;

calculating an availability-score of the communication-channel-type during the interaction based on the score of each analysis of the one or more analyses, storing the calculated availability-score, in a data storage, as an availability-score of the agent;

displaying the availability-score as an indication to an availability of the agent via the communication-channel-type, on a display unit, associated with the computerized system;

associating the availability-score to a channel category based on the availability score; and sending a visual cue to the agent during the interaction when the communication-channel-type is different than the associated category of the availability-score to be displayed on a display unit associated to the communication device during the interaction, wherein the communication-channel-type is selected from at least one of: voice channel, digital channel in real-time and digital channel in non real-time, wherein the one or more analyses operated on the collected data are selected from at least one of: sentiment analysis; network quality analysis; ambient noise analysis; and agent movement analysis, wherein the network quality analysis includes voice network strength and stability of internet connection strength, and wherein when the communication-channel-type is digital, and the internet connection strength is below a first preconfigured threshold, and a voice network strength is above a second preconfigured threshold, associating the availability-score to a voice-channel category.

* * * * *